US011909545B2

(12) United States Patent
Thubert et al.

(10) Patent No.: US 11,909,545 B2
(45) Date of Patent: *Feb. 20, 2024

(54) LOCALIZED MULTICAST IN A LOW POWER AND LOSSY NETWORK BASED ON RANK-BASED DISTANCE

(71) Applicant: Cisco Technology, Inc., San Jose, CA (US)

(72) Inventors: Pascal Thubert, Roquefort les Pins (FR); Huimin She, Shanghai (CN); Chuanwei Li, Shanghai (CN); Lele Zhang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,768

(22) Filed: Jul. 18, 2022

(65) Prior Publication Data

US 2022/0353103 A1 Nov. 3, 2022

Related U.S. Application Data

(62) Division of application No. 16/789,862, filed on Feb. 13, 2020, now Pat. No. 11,431,518.

(51) Int. Cl.
*H04L 12/18* (2006.01)
*H04L 12/46* (2006.01)
(Continued)

(52) U.S. Cl.
CPC .......... *H04L 12/1845* (2013.01); *H04L 1/08* (2013.01); *H04L 12/189* (2013.01); *H04L 12/4633* (2013.01); *H04L 45/32* (2013.01)

(58) Field of Classification Search
CPC ........ H04W 4/38; H04W 40/08; H04W 40/14
See application file for complete search history.

(56) References Cited

U.S. PATENT DOCUMENTS

| 6,816,460 | B1 | 11/2004 | Ahmed et al. |
| 9,210,045 | B2 | 12/2015 | Shaffer et al. |

(Continued)

FOREIGN PATENT DOCUMENTS

CN 102149160 B 8/2011

OTHER PUBLICATIONS

Kuperman et al., "Group Centric Networking: A New Approach for Wireless Multi-Hop Networking to Enable the Internet of Things", Nov. 25, 2015, [online], [retrieved on Dec. 4, 2019]. Retrieved from the Internet: URL: <https://arxiv.org/pdf/1511.08114.pdf>, pp. 1-14.

(Continued)

*Primary Examiner* — Yee F Lam
(74) *Attorney, Agent, or Firm* — BEHMKE INNOVATION GROUP LLC; James M. Behmke; James J. Wong (57) ABSTRACT

In one embodiment, a method comprises: identifying, by a low power and lossy network (LLN) device in a low power and lossy network, a minimum distance value and a distance limit value for limiting multicast propagation, initiated at the LLN device, of a multicast data message in the LLN; and multicast transmitting, by the LLN device, the multicast data message with a current distance field specifying the minimum distance value and a distance limit field specifying the distance limit value, the multicast transmitting causing a receiving LLN device having a corresponding rank in the LLN to respond to the multicast data message by: (1) determining an updated distance based on adding to the current distance field a rank difference between the receiving LLN device and the LLN device, and (2) selectively retransmitting the multicast data message if the updated distance is less than the distance limit value.

6 Claims, 7 Drawing Sheets

(51) Int. Cl.
*H04L 45/00* (2022.01)
*H04L 1/08* (2006.01)

(56) References Cited

U.S. PATENT DOCUMENTS

| | | | |
|---|---|---|---|
| 10,419,293 | B1 | 9/2019 | She et al. |
| 10,938,707 | B2 | 3/2021 | She et al. |
| 2011/0176416 | A1 | 7/2011 | Bhatti et al. |
| 2012/0230222 | A1* | 9/2012 | Shaffer .................. H04L 45/48 370/254 |
| 2013/0121335 | A1 | 5/2013 | Hui et al. |
| 2013/0208583 | A1* | 8/2013 | Guo ........................ H04L 45/28 370/225 |
| 2013/0250808 | A1 | 9/2013 | Hui et al. |
| 2014/0126426 | A1* | 5/2014 | Vasseur .................. H04L 45/48 370/256 |
| 2014/0204759 | A1* | 7/2014 | Guo .................. H04W 28/0236 370/236 |
| 2015/0236947 | A1 | 8/2015 | Kobayashi et al. |
| 2016/0212010 | A1* | 7/2016 | Oba ...................... H04W 12/08 |
| 2017/0019804 | A1 | 1/2017 | Morchon et al. |
| 2017/0099218 | A1* | 4/2017 | Holcombe ............. H04L 45/48 |
| 2019/0165961 | A1 | 5/2019 | Bartier et al. |
| 2019/0165964 | A1 | 5/2019 | Bartier et al. |
| 2020/0007425 | A1 | 1/2020 | Monier et al. |
| 2020/0145897 | A1* | 5/2020 | Jin .......................... H04W 4/38 |
| 2021/0067462 | A1* | 3/2021 | Jin .......................... H04L 49/25 |
| 2021/0258182 | A1 | 8/2021 | Thubert et al. |

OTHER PUBLICATIONS

Deering et al., "IPv6 Scoped Address Architecture", Network Working Group, Request for Comments: 4007, Mar. 2005, [online], [retrieved on Jan. 30, 2020]. Retrieved from the Internet: URL: <https://tools.ietf.org/pdf/rfc4007.pdf>, pp. 1-24.

Schmidt et al., "Multicast Mobility in Mobile IP Version 6 (MIPv6) : Problem Statement and Brief Survey", Internet Research Task Force (IRTF), Request for Comments: 5757, Feb. 2010, [online], [retrieved on Feb. 5, 2020]. Retrieved from the Internet: URL: <https://tools.ietf.org/pdf/rfc5757.pdf>, pp. 1-37.

Levis et al., "The Trickle Algorithm", Internet Engineering Task Force (IETF), Request for Comments: 6206, Mar. 2011, [online], [retrieved on Feb. 4, 2020]. Retrieved from the Internet: URL: <https://tools.ietf.org/pdf/rfc6206.pdf>, pp. 1-13.

Winter, Ed., et al., "RPL: IPv6 Routing Protocol for Low-Power and Lossy Networks", Internet Engineering Task Force (IETF), Request for Comments: 6550, Mar. 2012, [online], [retrieved on Jan. 31, 2020]. Retrieved from the Internet: URL: <https://tools.ietf.org/pdf/rfc6550.pdf>, pp. 1-157.

Hui et al., "Multicast Protocol for Low-Power and Lossy Networks (MPL)", Internet Engineering Task Force (IETF), Request for Comments: 7731, Feb. 2016, [online], [retrieved on Jan. 30, 2020]. Retrieved from the Internet: URL: <https://tools.ietf.org/pdf/rfc7731.pdf>, pp. 1-29.

Sobral et al., "Routing Protocols for Low Power and Lossy Networks in Internet of Things Applications", May 9, 2019, [online], [retrieved on Dec. 4, 2019]. Retrieved from the Internet: URL: <https://www.google.com/url?sa=t&rct=j&q=&esrc=s&source=web&cd=1&cad=rja&uact=8&ved=2ahUKEwjXyp6ojpvmAhW5yDgGHTnQA_kQFjAAegQIARAC&url=https%3A%2F%2Fwww.mdpi.com%2F1424-8220%2F19%2F9%2F2144%2Fpdf&usg=AOvVaw2QhuPaFMzRpigrNXXk_Rqm>, pp. 1-40.

* cited by examiner

LOCALIZED MULTICAST IN A LOW POWER AND LOSSY NETWORK BASED ON RANK-BASED DISTANCE

This application is a divisional of application Ser. No. 16/789,862, filed Feb. 13, 2020.

TECHNICAL FIELD

The present disclosure generally relates to localized multicast in a low power and lossy network based on rank-based distance.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as LLN devices or "RPL nodes". Each RPL node in the LLN typically is constrained by processing power, memory, and energy (e.g., battery power); interconnecting wireless links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The constraints in processing power, memory, and energy in the RPL nodes described above also prevent a given RPL node from maintaining a multicast routing topology, especially since the inherently dynamic properties in the wireless links prevent the RPL nodes from maintaining any multicast routing topology in response to dynamic changes in the wireless links.

Hence, a substantial problem is that multicast transmission of a multicast data message within an LLN utilizing a DODAG-based topology and comprising thousands of LLN devices can cause substantial interference for LLN devices that have no need for the multicast data message, for example where the multicast data message is intended only for LLN devices located within a relatively small subDAG within the LLN.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: identifying, by a low power and lossy network (LLN) device in a low power and lossy network, a minimum distance value and a distance limit value for limiting multicast propagation, initiated at the LLN device, of a multicast data message in the LLN; and multicast transmitting, by the LLN device, the multicast data message with a current distance field specifying the minimum distance value and a distance limit field specifying the distance limit value, the multicast transmitting causing a receiving LLN device having a corresponding rank in the LLN to respond to the multicast data message by: (1) determining an updated distance based on adding to the current distance field a rank difference between the receiving LLN device and the LLN device, and (2) selectively retransmitting the multicast data message if the updated distance is less than the distance limit value.

In another embodiment, one or more non-transitory tangible media encoded with logic for execution by a machine and when executed by the machine operable for: identifying, by the machine implemented as a low power and lossy network (LLN) device in a low power and lossy network, a minimum distance value and a distance limit value for limiting multicast propagation, initiated at the LLN device, of a multicast data message in the LLN; and multicast transmitting, by the LLN device, the multicast data message with a current distance field specifying the minimum distance value and a distance limit field specifying the distance limit value, the multicast transmitting causing a receiving LLN device having a corresponding rank in the LLN to respond to the multicast data message by: (1) determining an updated distance based on adding to the current distance field a rank difference between the receiving LLN device and the LLN device, and (2) selectively retransmitting the multicast data message if the updated distance is less than the distance limit value.

In another embodiment, a method comprises: receiving, by a receiving low power and lossy network (LLN) device in a low power and lossy network, one or more multicast data messages from respective one or more neighboring transmitting LLN devices in the LLN; detecting, by the receiving LLN device among the one or more multicast data messages, a lowest distance value in a current distance field and a distance limit value in a distance limit field, the lowest distance value indicating a multicast transmission distance of the corresponding one neighboring transmitting LLN device relative to a multicast origin of the one or more multicast data messages; determining, by the receiving LLN device, an updated distance to the multicast origin based on adding to the lowest distance value a rank difference between the corresponding neighboring transmitting LLN device and the receiving LLN device; and selectively multicast transmitting, by the receiving LLN device, the multicast data message based on determining the updated distance is less than the distance limit value that limits multicast propagation, the selectively multicast transmitting including updating the current distance field with the updated distance value prior to transmission.

In another embodiment, one or more non-transitory tangible media encoded with logic for execution by a machine and when executed by the machine operable for: receiving, by a machine implemented as a receiving low power and lossy network (LLN) device in a low power and lossy network, one or more multicast data messages from respective one or more neighboring transmitting LLN devices in the LLN; detecting, by the receiving LLN device among the one or more multicast data messages, a lowest distance value in a current distance field and a distance limit value in a distance limit field, the lowest distance value indicating a multicast transmission distance of the corresponding one neighboring transmitting LLN device relative to a multicast origin of the one or more multicast data messages; determining, by the receiving LLN device, an updated distance to the multicast origin based on adding to the lowest distance value a rank difference between the corresponding neighboring transmitting LLN device and the receiving LLN device; and selectively multicast transmitting, by the receiving LLN device, the multicast data message based on determining the updated distance is less than the distance limit value that limits multicast propagation, the selectively multicast transmitting including updating the current distance field with the updated distance value prior to transmission.

In another embodiment, one or more non-transitory tangible media encoded with logic for execution by a machine and when executed by the machine operable for: limiting multicast propagation of a multicast data message in a low power and lossy network (LLN) based on setting, by the machine implemented as a root network device in the LLN, a distance limit value for limiting the multicast propagation; and unicast transmitting, by the root network device, a unicast message containing the multicast data message and the distance limit value to an LLN device via the LLN, the unicast message causing the LLN device to multicast transmit the multicast data message with a current distance field specifying a minimum distance value of the LLN device and a distance limit field specifying the distance limit value; wherein the limiting multicast propagation in the LLN is based on the multicast data message causing a receiving LLN device having a corresponding rank in the LLN to: (1) determine an updated distance based on adding to the current distance field a rank difference between the receiving LLN device and the LLN device, and (2) selectively retransmit the multicast data message if the updated distance is less than the distance limit value, wherein the receiving LLN device suppresses any transmission of the multicast data message if the updated distance is not less than the distance limit value.

DETAILED DESCRIPTION

Particular embodiments enable scalable and localized propagation of multicast data messages in a low power and lossy network (LLN) utilizing a DODAG-based topology, for example according to the Internet Engineering Task Force (IETF) Request for Comments (RFC) 6550 and/or RFC 7731, where rank-based distance limit values can be used for limiting (i.e., localizing) multicast propagation to within an identifiable area in the DODAG topology. The example embodiments enable the multicast propagation range in the LLN to be defined based on an identifiable objective function (OF), enabling the multicast propagation range (limited by a distance limit value relative to a multicast origin device) to be established according to the DODAG topology and/or a multicast routing topology having its own corresponding objective function.

Hence, the example embodiments enable localized multicast based on a rank-based distance limit value, enabling multicast to be confined within a prescribed portion of the DODAG topology.

The example embodiments can be particularly effective in limiting multicast propagation to within an identifiable physical location, for example limiting multicast propagation of a multicast message to an identifiable room (e.g., a meter "vault") containing multiple CG-mesh based metering devices for respective apartment dwelling units in a large apartment building, where the CG-mesh based metering devices in the meter "vault" are part of a large-scale CG-mesh network infrastructure comprising hundreds or thousands of meter "vaults" across a large city in an electrical grid. In this example, a network management device in the CG-mesh based infrastructure (providing electrical grid metering for the large city) can implement projected localized multicast based on unicast transmission of a unicast message (comprising the multicast message and associated distance limit value) to a destination multicast origin within the meter "vault": the multicast origin can respond to the unicast message by multicast transmitting the multicast data message with the distance limit value, enabling multicast propagation of the multicast data message to be confined within the meter "vault" based on the associated rank values of the CG-mesh metering devices within the vault relative to the multicast origin and the distance limit value.

Figure 1:
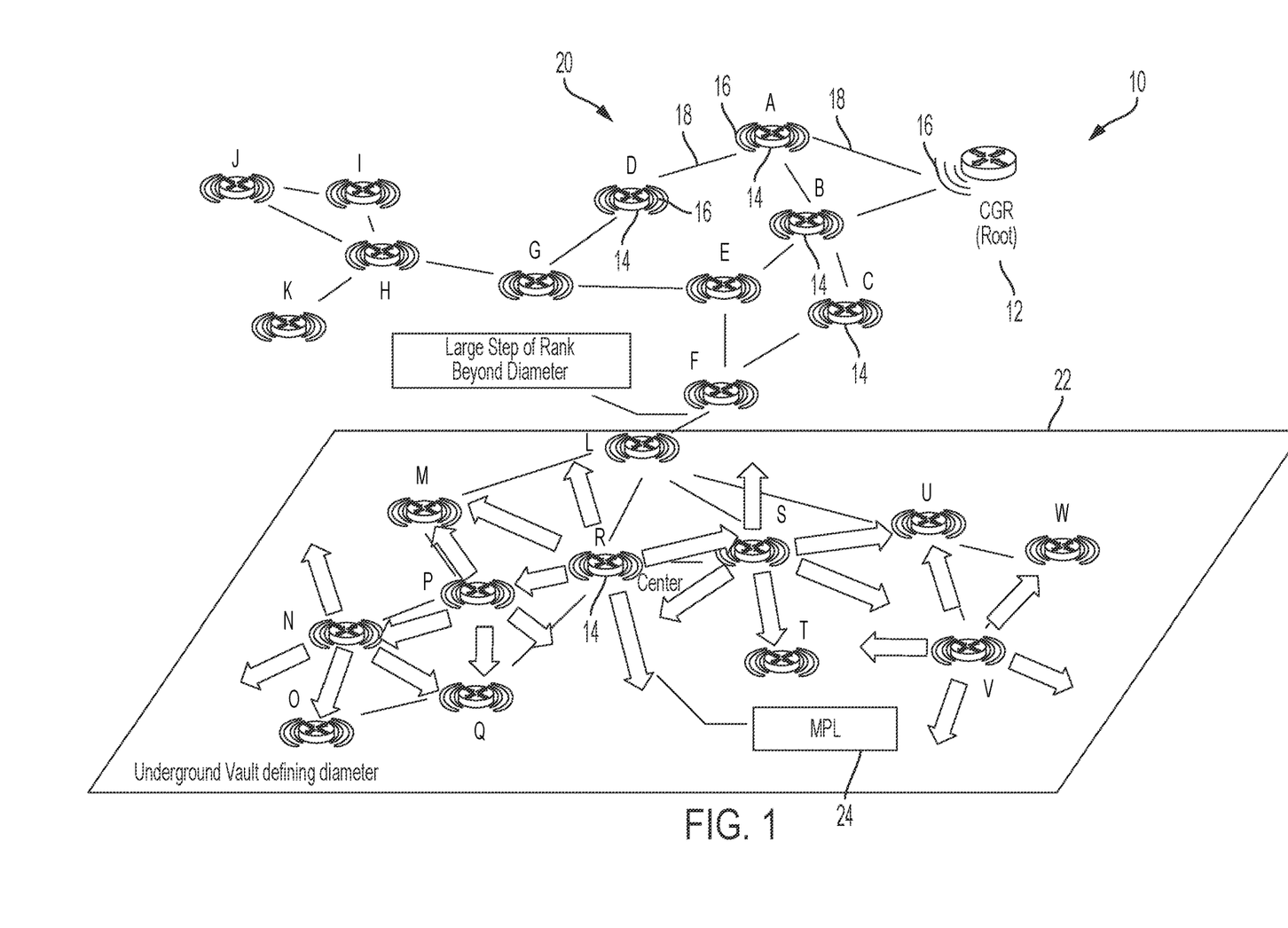
FIG. 1 illustrates an example low power and lossy network (LLN) having an apparatus configured for limiting propagation of a multicast data message in the LLN, according to an example embodiment.
Figure 2:
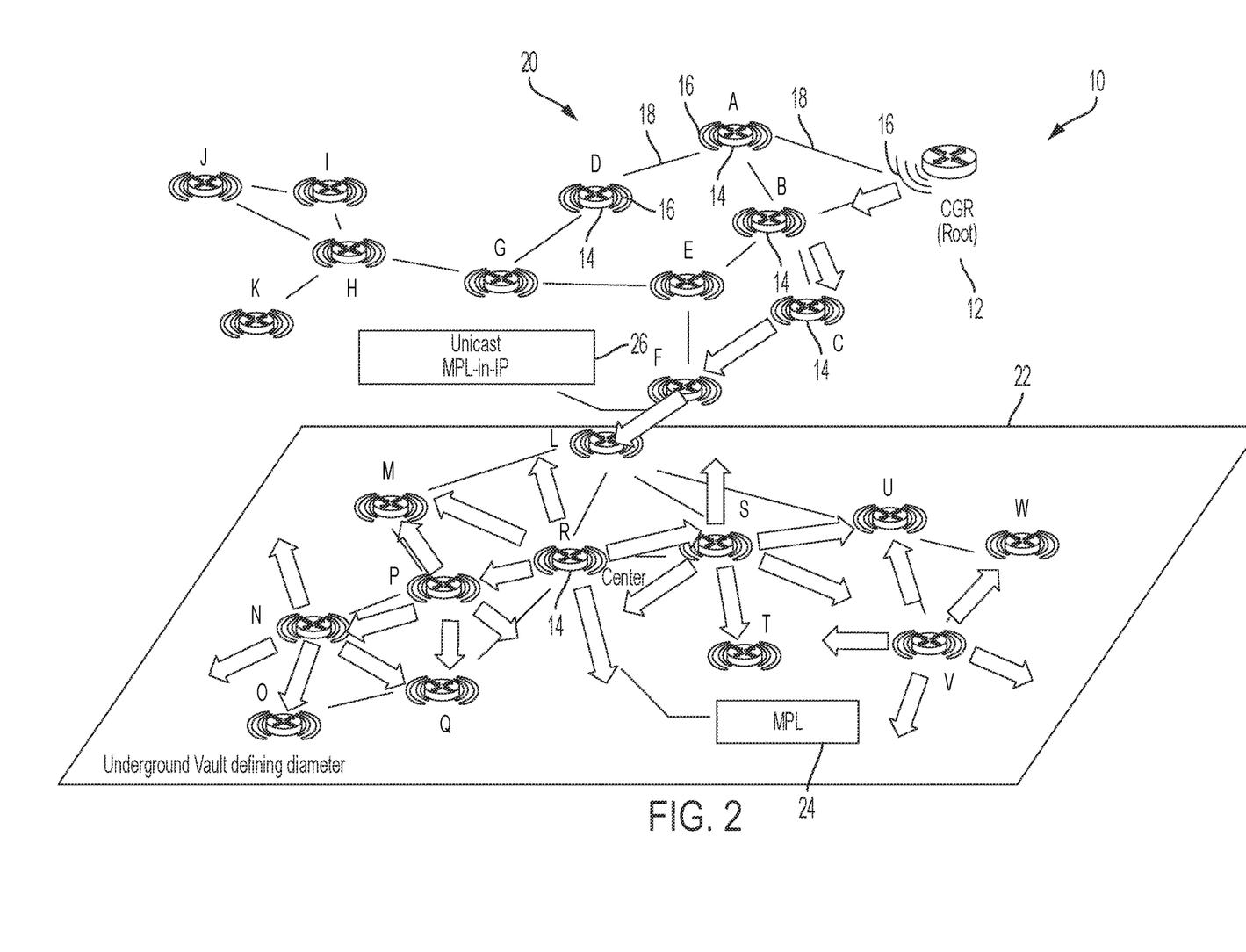
FIG. 2 illustrates another example low power and lossy network (LLN) having one or more network devices configured for limiting propagation of a multicast data message in the LLN, according to an example embodiment.

FIGS. 1 and 2 are diagrams illustrating an example low power and lossy network (LLN) 10 having a root network device 12 and LLN devices (e.g., "A" through "W") 14, also referred to as RPL devices or RPL network devices 14, according to an example embodiment. The LLN 10 can be implemented as an Internet Protocol version 6 (IPv6) wireless radio frequency (RF) mesh network, deployed for example using wireless link layer protocols such as IEEE 802.15.4e and/or IEEE 802.15.4g (referred to herein as "IEEE 802.15.4e/g"). In particular, the LLN 10 can be implemented as a smart grid Advanced Metering Infrastructure (AMI) network that can utilize a connected grid mesh (CG-Mesh) that comprises a field area router (FAR) implemented as a root network device 12 and thousands of LLN devices 14, where each LLN device 14 can possibly reach, within its transmission range of its corresponding wireless data link 16, hundreds of neighboring LLN devices 14. The root network device 12 can be implemented, for example, based on a commercially-available Cisco® Connected Grid Router (CGR) such as the CGR 1000 Series, commercially available from Cisco Systems, San Jose, California, modified as described herein.

A Low-Power and Lossy Network (LLN) 10 typically operates with strict resource constraints in communication, computation, memory, and energy. Such resource constraints may preclude the use of existing IPv6 multicast routing and forwarding mechanisms. Traditional IP multicast delivery typically relies on topology maintenance mechanisms to discover and maintain routes to all subscribers of a multicast group. However, maintaining such topologies in LLNs is costly and may not be feasible given the available resources.

Memory constraints may limit LLN devices 14 to maintaining links and/or routes to one or a few neighbors, hence RPL according to RFC 6550 specifies both storing and non-storing modes: non-storing mode enables a RPL network device 14 to maintain only one or a few default routes towards an LLN Border Router (LBR) (i.e., root network device) 12 and use source routing to forward messages away from the LBR. The memory constraints also prevent an LLN device 14 from maintaining a multicast routing topology.

A network topology (e.g., a "RPL instance" according to RFC 6550) 20 can be established based on creating routes toward a single "root" network device (e.g., a backbone router) 12 in the form of a directed acyclic graph (DAG) toward the DAG root 12, where all routes in the LLN 10 terminate at the DAG root 12 (also referred to as a "DAG destination"). Hence, the DAG also is referred to as a Destination Oriented DAG (DODAG) 20. Network traffic can move either "up" towards the DODAG root 12 or "down" away from the DODAG root 12 and towards the DODAG leaf nodes (e.g., leaf nodes "J", "K", "O", "T", etc.). The root network device 12 can output RPL-based DODAG Information Object (DIO) messages according to RFC 6550 and specifying an identified objective function (OF) and associated topology network metrics (including a DODAG rank of the advertising root network device 12), for formation of a DODAG-based network topology 20 that supports multicast operations.

A "child" network device detecting the DIO can select the DAG root 12 as a parent in the identified DODAG 20 based on comparing network topology metrics (advertised in the DIO) to an identifiable objective function of the RPL instance (e.g., specified in the DIO). The "child" network device, upon attaching to its parent, can output its own DIO with updated network topology metrics (including an updated DODAG rank) that enable other RPL network devices 14 to discover the DODAG 20, learn the updated network topology metrics, and select a DODAG parent.

As described in RFC 6550, each RPL network device 14, in response to the root network device 12 and/or a parent RPL network device 14 in the tree-based DODAG topology 20, can execute an objective function (OF) specified in the DIO message that enables the RPL network device 14 to determine its own "rank" within the DODAG topology 20, where the root network device 12 can be allocated a relatively low-valued rank (e.g., "1"), and a next-hop LLN device (e.g., "A" or "B") can calculate a relatively-higher rank (e.g., "20") based on the corresponding rank of the parent root network device 12 (specified in the received DIO Message) and topology-based metrics associated with execution of the OF. Hence, a LLN device 14, in response to attaching to the root network device 12, can output an updated DIO message specifying the corresponding "rank" of the RPL network device 14 relative to the root network device 12, enabling other network devices to join the tree-based DODAG topology 20 resulting in the tree-based DODAG topology. Hence, a child (e.g., "C") 14 can use the identified objective function and calculate for itself a higher rank (e.g., "50") relative to the corresponding rank (e.g., "20") advertised by its parent (e.g., "B"), and output an updated DIO specifying the corresponding rank (e.g., "50"), enabling the next child device (e.g., "F") 14 to calculate its own corresponding rank (e.g., "100"), etc.

Hence, a LLN device 14 can calculate its own rank within the DODAG 20 based on executing the objective function identified in the received DIO message, and based on the advertised rank and advertised metrics from the received DIO message, detected attributes (e.g., Received Signal Strength Indicator (RSSI)) associated with reception of the DIO message, prescribed constraints or policies set in the LLN device 14 (e.g., minimum/maximum permitted rank values, etc.). Hence the "rank" used by a LLN device 14 can identify a relative positional priority of the LLN device 14 within the LLN device 14, but is distinct from a hop count value: in other words, a "hop count" is not and cannot be used as a "rank" as described herein because a "rank" monotonically increases away from the root network device 12 for formation of the DODAG 20, and the "rank" is determined based on execution of an identified objective function (and therefore can have a nonlinear increase in rank values). Additional details regarding calculating a rank value can be found, for example, in Section 8.2 of RFC 6550.

Downward routes (i.e., away from the DAG root 12) can be created based on Destination Advertisement Object (DAO) messages that are created by a RPL node 14 and propagated toward the DAG root 12. The root network device 12 generating the RPL instance 20 can implement downward routes in the DAG 20 of the LLN 10 in either a storing mode only (fully stateful), or a non-storing mode only (fully source routed by the DAG root). In storing mode, a RPL node 14 unicasts its DAO message to its parent node, such that RPL nodes 14 store downward routing table entries for their "sub-DAG" (the "child" nodes connected to the RPL node). In non-storing mode the RPL nodes 14 do not store downward routing tables, hence a RPL node 14 unicasts its DAO message to the DAG root 12, such that all data packets are sent to the DAG root 12 and routed downward with source routes inserted by the DAG root 12.

Although only the RPL network devices "A", "B", "C", "D", and "R" are labeled with the reference numeral "14" to avoid cluttering in the Figures, it should be apparent that all the RPL network devices "A" through "W" are allocated the reference numeral "14" for purposes of the description herein. Further, it should be apparent that all the network devices "A" through "W" 14 are configured for establishing wireless data links 16 and DODAG parent-child connections 18 (collectively "wireless DODAG parent-child connections"), even though only the wireless DODAG parent-child connections 18 between the root network device 12 and the RPL network devices "A" and "D" 14 are labeled with the reference numeral "18" (and only the wireless data links 16 of the root network device 12 and the RPL network devices "A" and "D" are labeled) to avoid cluttering in the Figures.

Conventional deployments of the RPL protocol (e.g., according to RFC 6550) can suffer from many inefficiencies in a DAG network topology 20 in LLNs 10 that contain thousands of network devices 14 that are densely deployed in the data network 10. In one example, unrestricted propagation of multicast messages downward in the DODAG 20 of the LLN 10 can enable the root network device 12 to propagate critical management messages to all LLN devices 14, however such unrestricted propagation can create substantial traffic loads in the LLN 10; hence, unrestricted multicasting from the root network device 12 is not scalable in the LLN 10 due to the substantial traffic loads that would be encountered.

Moreover, non-root initiated multicasting (i.e., initiated by an LLN device 14) can result in unwanted propagation of multicast messages throughout the LLN 10, including multicasting to LLN devices 14 that have no need for the multicast messages; such unwanted propagation of multicast messages also can create security issues by enabling rogue network devices to detect multicast messages from any location in the LLN 10. As illustrated in FIGS. 1 and 2, the network devices "L" through "W" are illustrated as positioned within a limited region 22 of the LLN 10, for example within an underground room of an apartment building, where the limited region 22 can be used for deployment of a meter "vault" comprising multiple CG-mesh based metering devices "L" through "W" 12 for respective aboveground apartment dwelling units in a large apartment building, where the network device "L" serves as the gateway between the "vault" 22 and the CGI network 10. Hence, unrestricted propagation of a multicast message 24 that is relevant only to the CG-mesh metering devices "L" through "W" 14 in the limited region 22 could cause undesirable traffic congestion outside the limited region 22 (e.g., if the multicast data message 24 was multicast transmitted by the CG-mesh metering device "L" 14 to its "gateway" device "F" outside the limited region 22), and could result in additional security risks by exposing the network devices "L" through "W" to potential rogue network devices outside the limited region 22.

Hence, the example embodiments described herein enable localized multicast based on a rank-based distance limit value, enabling propagation of multicast messages 24 to be confined within a limited region 22 of the DODAG topology 20. As described below, the rank-based distance limit value can cause the LLN device "L" (and/or "F") 14 to suppress any multicast transmission of the multicast data message 24 outside the limited region 22 based on its rank in the limited region 22 relative to the rank-based distance limit value relative to the multicast origin "R".

Hence, the example embodiments described herein enable localized multicast within a limited region 22 of the DODAG 20, enabling maximal use of localized multicasting while maintaining network security and preventing transmissions outside the limited region 22. As described below, the multicast propagation may be initiated by a multicast origin device "R" 14 generating the multicast data message 24 as illustrated in FIG. 1.

As illustrated in FIG. 2 and as described in further detail below, the multicast propagation also can be initiated based on the root network device 12 "tunneling" to the multicast origin device "R" 14 a unicast data packet 26 that comprises at least the payload of the multicast message, and that also can include the rank-based distance limit value that can limit propagation of the multicast data message 24 to within the limited region 22. Hence, the root network device 12 can initiate a projected localized multicast of a multicast data message 24 within a specific limited region 22, enabling distribution of location-specific metering instructions (e.g., control data for a specific apartment building, software updates on a per-building basis, etc.) in a scalable manner.

Figure 3:
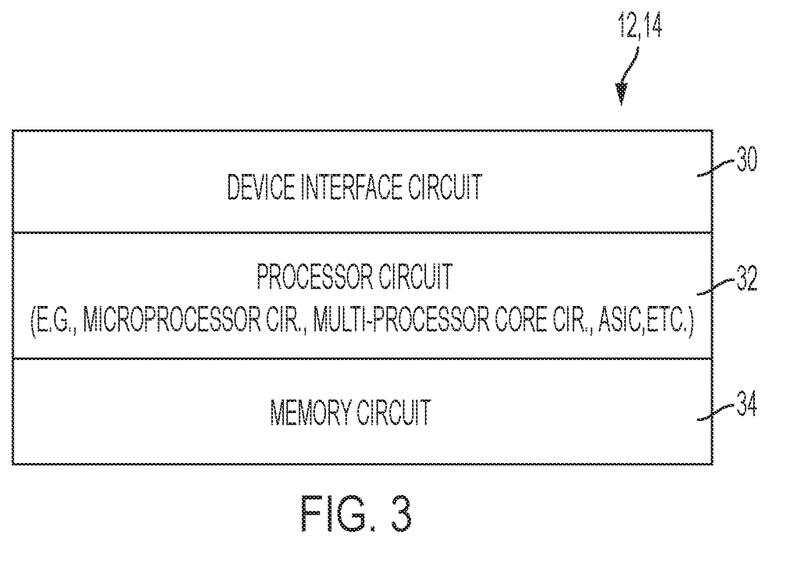
FIG. 3 illustrates an example implementation of any of the network devices of FIG. 1 or 2, according to an example embodiment.

FIG. 3 illustrates an example implementation of any of the network devices 12, 14 of FIG. 1 or 2, according to an example embodiment. Each apparatus 12, 14 is a physical machine (i.e., a hardware device) configured for implementing network communications with other physical machines via the LLN 10. The term "configured for" or "configured to" as used herein with respect to a specified operation refers to a device and/or machine that is physically constructed and arranged to perform the specified operation.

Each apparatus 12, 14 can include a device interface circuit 30, a processor circuit 32, and a memory circuit 34. The device interface circuit 30 can include one or more distinct physical layer transceivers for communication with any one of the other devices 12, 14; the device interface circuit 30 also can include an IEEE based Ethernet transceiver for communications with the devices of FIG. 1 via any type of data link (e.g., a wired or wireless link, an optical link, etc.). The processor circuit 32 can be configured for executing any of the operations described herein, and the memory circuit 34 can be configured for storing any data or data packets as described herein.

Any of the disclosed circuits of the devices 12, 14 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4A:
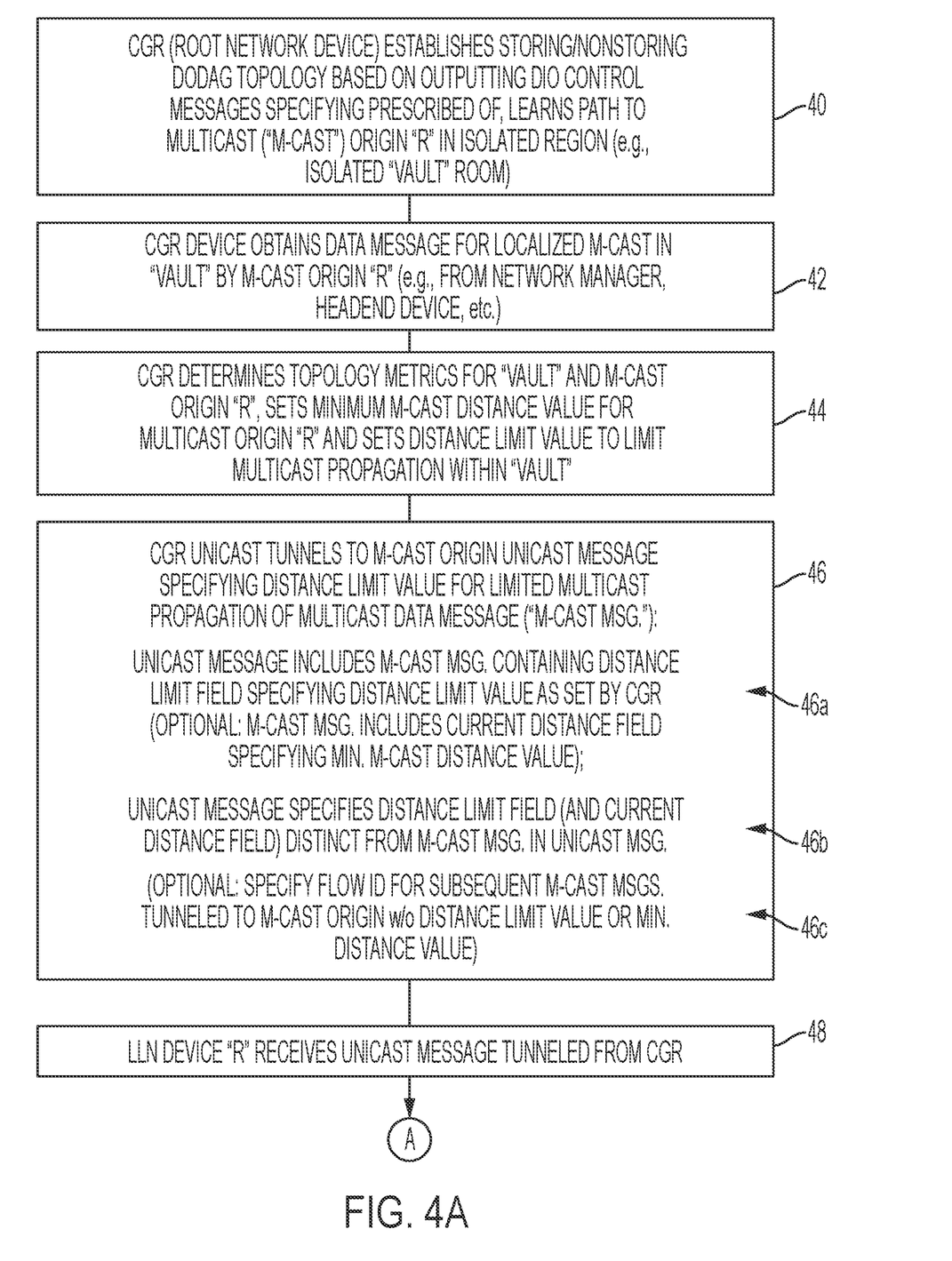
FIGS. 4A-4C illustrates an example method of limiting propagation of a multicast data message in the LLN, according to an example embodiment.
Figure 4B:
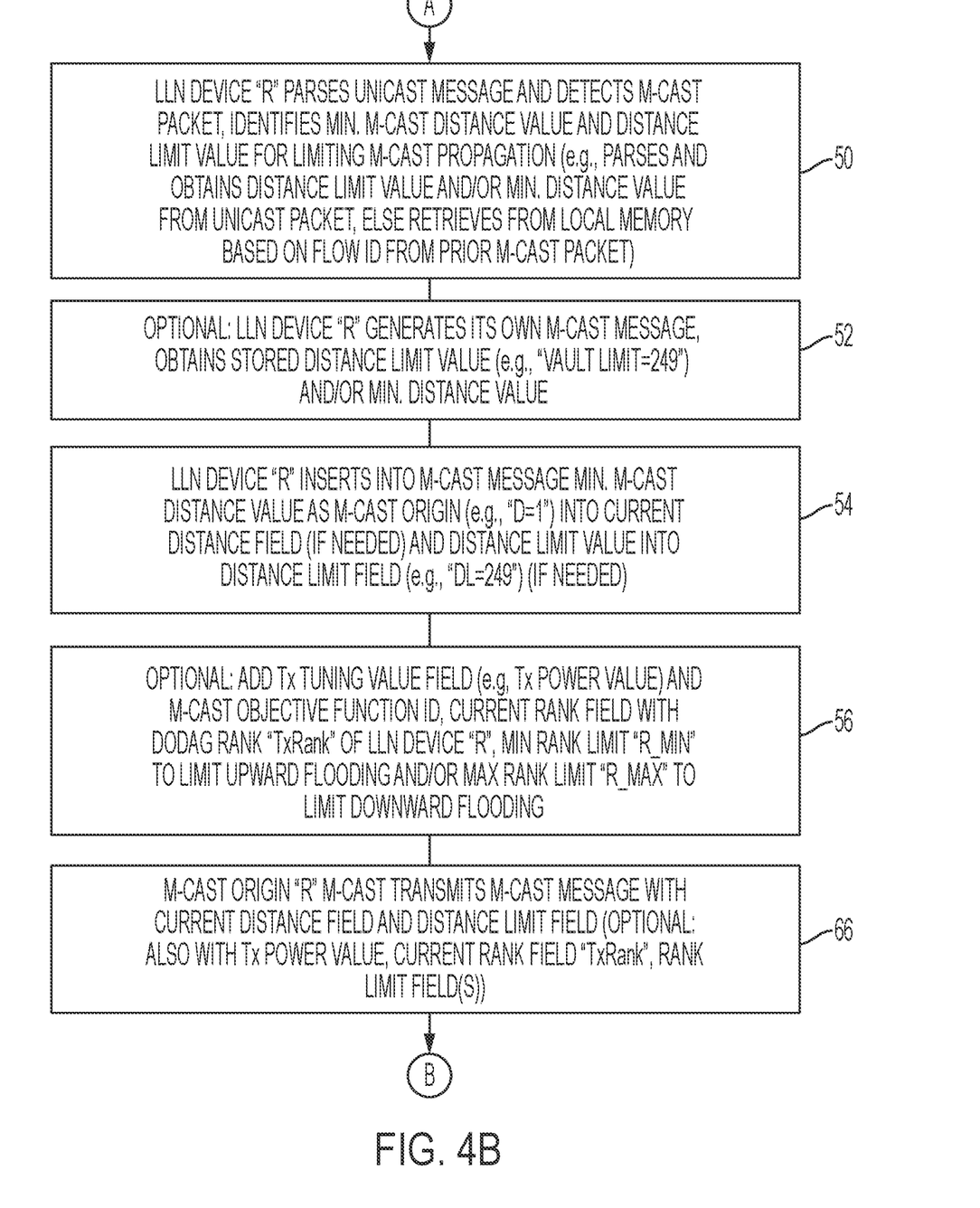
Figure 4C:
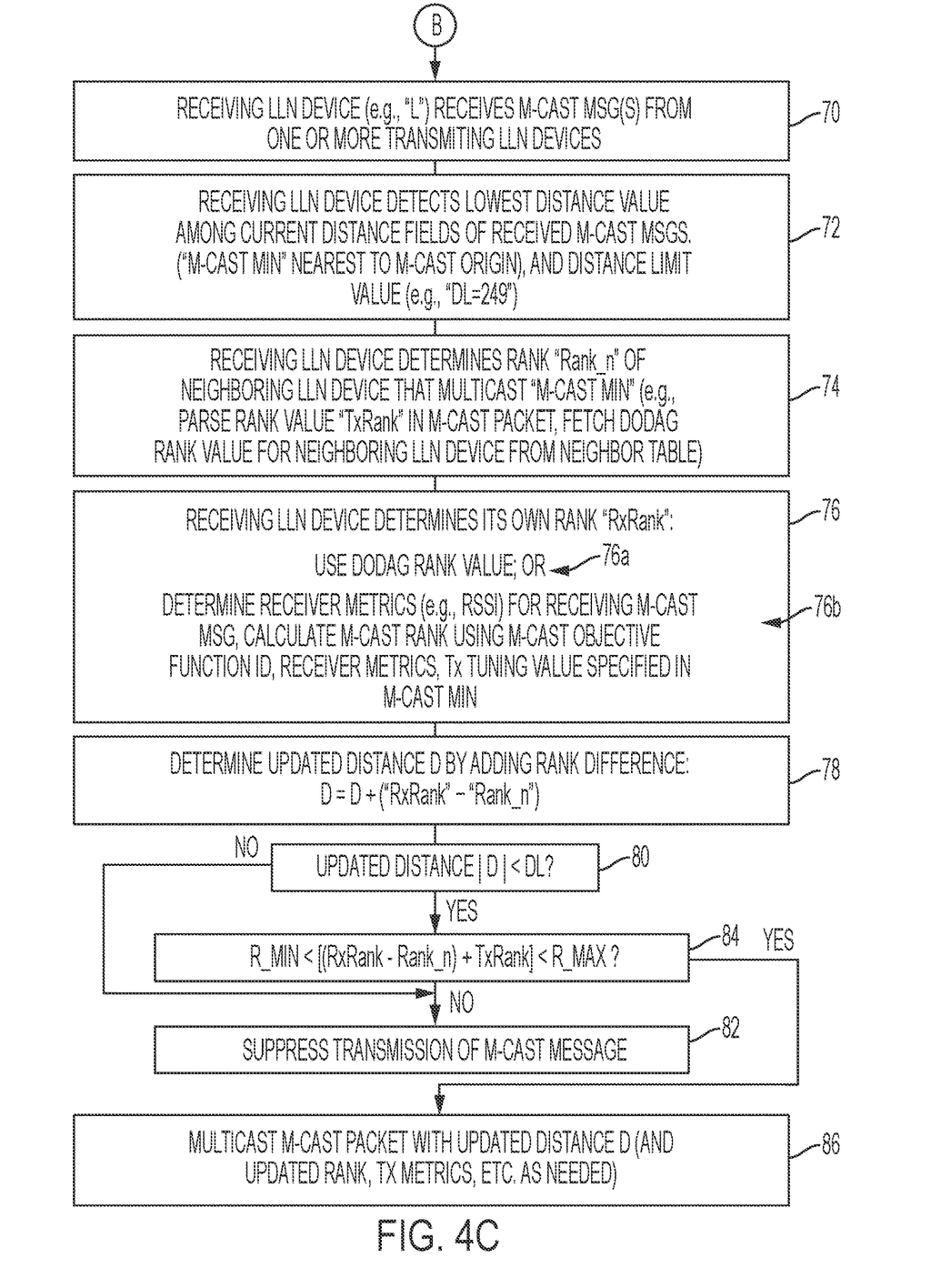

FIGS. 4A-4C illustrate an example method of limiting propagation of a multicast data message in the LLN, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 32 of the root network device 12 in operation 40 can establish the DODAG 20, for example in storing mode or nonstoring mode, based on outputting a DIO control message specifying the prescribed objective function (OF), for example as described in RFC 6550, and specifying that multicasting is enabled (e.g., "Mode of Operation" (MOP) "3" in RFC 6550).

The processor circuit 32 of the root network device 12 in operation 40 also can establish the LLN 10, for example in a CG-Mesh network, based on a network joining process that can include: (1) PAN selection, where a joining node 14 either listens for a discover beacon or sends out a discover beacon request to select a Personal Area Network (PAN); (2) Authentication, where a joining node 14 can perform 802.1x mutual authentication and obtain security keys from the Root and/or a parent network device, or other authentication device; (3) PAN configuration where a joining node 14 either listens for a configuration beacon or sends out configuration beacon request to obtain PAN-wide information, such as broadcast schedule, PAN version; and (4) Routing formation, where a joining node 14 obtains an IPv6 address and advertises it to the FAR Root device 12 to configure a downward route from the FAR root device to the joining node 12.

Assuming a RPL-based DODAG 20 is formed in operation 40, the processor circuit 32 of the root network device 12 in operation 40 can learn a path to a network device "R" 14 in a limited region 22 (e.g., within an identified meter "vault" in an identifiable building) that can operate as a multicast origin for multicast transmission of one or more multicast data messages 24 within the limited region 22 of the DODAG 20, for example based on DAO messages from each of the LLN devices 14. In one example, the root network device 12 can implement the DODAG 20 in non-storing mode, ensuring the root network device 12 can obtain a DAO message from each LLN device 14 for learning of topology parameters associated with each limited region 22 in the DODAG 20; alternately, the root network device 12 can implement the DODAG 20 in storing mode, where each "gateway" device (e.g., "L" and/or "F") for a corresponding limited region 22 can send selected topology parameters associated with the limited region 22 to the root network device 12.

Following establishment of the DODAG 20, the root network device 12 in operation 42 can obtain a data message (e.g., from a network manager or headend device, etc., not shown in the Figures) for localized multicast in the limited region 22: the data message can be supplied with an identifier for the multicast origin (e.g., the LLN device "R"), or the root network device 12 can select the multicast origin "R" 14, for example in operation 44.

The processor circuit 32 of the root network device 12 in operation 44 can determine the topology parameters and topology metrics for the limited region 22 in the DODAG 20, including for example the ranges of rank values between the "gateway" devices "F" and/or "L" and the ranges of rank values of each of the member LLN devices "L" through "W" that belong to the limited region 22. The processor circuit 32 of the root network device 12 in operation 44 can identify the LLN device "R" 14 as the multicast origin for a multicast data message 24, and can set a minimum multicast ("mcast") distance value (e.g., "D=1" 46 of FIG. 5) that identifies the LLN device "R" 14 as a multicast origin; the processor circuit 32 of the root network device 12 in operation 44 also can set a distance limit value (e.g., "DL=249" 48 of FIG. 5), for example based on determining (e.g., from prior messages received from the LLN devices 14) that the DODAG rank value for the gateway device "F" into the limited region 22 (as calculated by "F" during OF execution while joining the DODAG 20) is "Rank_F=100", the DODAG rank value for the LLN device "L" device in the limited region 22 (as calculated by "L" during OF execution while joining the DODAG 20) is "Rank_L=500", and the DODAG rank value for the multicast origin LLN device "R" (as calculated by "R" during OF execution while joining the DODAG 20) is "Rank_R=750".

As described below, the distance limit value 48 set by the processor circuit 32 of the root network device 12 in operation 44 can cause each of the LLN devices "L" through "W" to limit multicast propagation of the multicast data message 24 to within the limited region 22, based on causing an LLN device 14 receiving the multicast data message 24 to suppress further multicast transmission of the received multicast data message 24 if the updated rank-based distance of the receiving LLN device 14 from the multicast origin "R" 14 in the limited region 22 is not less than the distance limit value 48.

As illustrated in FIG. 2 the processor circuit 32 of the root network device 12 in operation 46 of FIG. 4A can cause the device interface circuit 30 to unicast tunnel, to the LLN device "R" 14, the multicast data message 24 within a unicast data message 26. The unicast data message 26 can specify the distance limit value 48 (e.g., "DL=249" 48 of FIG. 5) that causes the multicast origin "R" 14 to limit the multicast propagation to within the limited region 22. As illustrated in FIG. 4A, in one example operation 46a the processor circuit 32 of the root network device 12 can generate (in operation 46a) the multicast data message 24 that includes a distance limit field (50 of FIG. 5) specifying the distance limit value 48, and that further includes a current distance field (52 of FIG. 5) specifying the minimum distance value 46 to be used by the multicast origin "R" 14.

The processor circuit 32 of the root network device 12 in operation 46b also can set the distance limit field 50 and the current distance field 52 as separate data fields in the unicast data message 26 that encapsulates the multicast data message 24 without the distance limit field 50 or the current distance field 52 (enabling the multicast origin "R" 14 to dynamically insert the distance limit field 50 specifying the distance limit value 48 and the current distance field 52 specifying the minimum distance value 46 into the multicast data message 24 prior to initiating multicast transmission in the limited region 22, as appropriate).

The processor circuit 32 of the root network device 12 in operation 46c also can specify within the unicast data message 26 a multicast flow identifier associated with the multicast data message 24, enabling the multicast origin "R" 14 to store the minimum distance value 46 and the distance limit value 48 and associated flow identifier in its memory circuit 34, enabling the multicast origin "R" 14 to identify the same minimum distance value 46 and distance limit value 48 for each multicast data message 24 associated with the multicast flow identifier.

The device interface circuit 30 of the multicast origin "R" 14 can receive in operation 48 the unicast data message 26 tunneled from the root network device 12.

Referring to FIG. 4B, the processor circuit 32 of the multicast origin "R" 14 in operation 50 can parse the unicast data message 26 and detect the multicast data message 24 encapsulated in the unicast data message 26. The processor circuit 32 of the multicast origin "R" 14 in operation 50 also can identify the minimum distance value 46 and the distance limit value 48 to be used in the multicast data message 24 prior to initiating multicast transmission in the limited region 22. As described previously, in one example the processor circuit 32 of the multicast origin "R" 14 in operation 50 can identify the distance limit value 48 from the distance limit field 50 of the unicast data message 26 and/or the encapsulated multicast data message 24, and the minimum distance value 46 specified in the current distance field 52 of the unicast data message 26 and/or the multicast data message 24; in another example the processor circuit 32 of the multicast origin "R" 14 in operation 50 can identify the distance limit value 48 from a stored table entry (in its memory circuit 34) that stores multicast parameters (e.g., the minimum distance value 46 and the distance limit value 48) associated with a prescribed multicast flow identifier.

The processor circuit 32 of the multicast origin "R" 14 in operation 52 also can generate its own multicast data message 24, for example a local reset message within the "vault" 22 in response to a local administrator input, etc., and in response obtain a locally-stored minimum distance value 46 and a locally-stored distance limit value 48.

The processor circuit 32 of the multicast origin "R" 14 in operation 54 can insert (if needed) into a multicast data message 24 its minimum distance value (e.g., "D=1") 46 into a current distance field 52, and the distance limit value (e.g., "DL=249") 48 into the distance limit field 50 of the multicast data message 24.

The processor circuit 32 of the multicast origin "R" 14 in operation 56 also can optionally add a wireless transceiver tuning value (e.g., a transmit ("Tx") power value) that is used by the device interface circuit 30 for wireless transmission of the multicast data message 24, and a multicast objective function identifier 56 that enables a receiving network device to calculate a multicast-based rank based on executing a multicast-based OF associated with the multicast objective function identifier 56 and based on the link layer metrics including the transmit power value 54, and a receive power value (e.g., RSSI) determined by the receiving LLN device 14.

The processor circuit 32 of the multicast origin "R" 14 in operation 56 also can optionally add a current rank field 58 specifying the current DODAG-based rank (e.g., "TxRank=750) 60, and a rank limit field 62 specifying one or more of a minimum rank limit "R_MIN" 68 and/or a maximum rank limit "R_MAX" 64. As described below, the minimum rank limit "R_MIN" 68 can limit upward flooding (toward the root network device 12), and the maximum rank limit "R_MAX" 64 can limit downward flooding (toward the leaves of the DODAG 20 inside the limited region 22).

Figure 5:
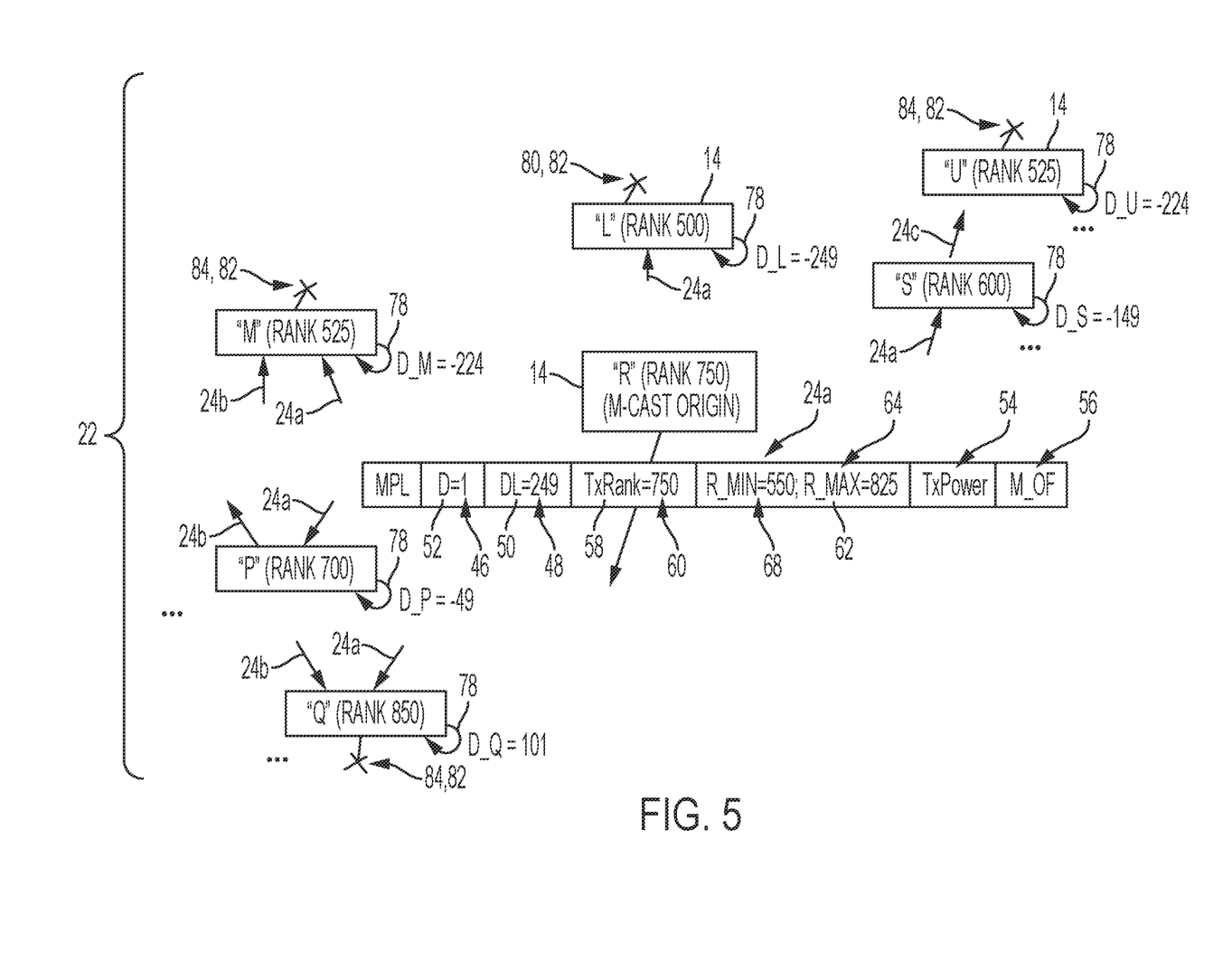
FIG. 5 illustrates an example multicast transmission of a multicast data message initiated by an LLN device operating as a multicast origin, according to an example embodiment.

The processor circuit 32 of the multicast origin "R" 14 in operation 66 can cause the device interface circuit 30 to initiate multicast propagation of the multicast data message 24 by multicast transmitting the multicast data message 24. As illustrated in FIG. 5, the multicast data message 24a output by the multicast origin "R" 14 comprises the current distance field 52 specifying the minimum distance value 46 that identifies the LLN device "R" as the multicast origin, and the distance limit field 50 specifying the distance limit "DL=249" 48. The multicast data message 24a also can comprise the transmit power value 54, the multicast objective function identifier 56, the current rank field 58 specifying the DODAG-based rank 60, and the rank limit field 62 specifying the minimum rank limit "R_MIN" and/or the maximum rank limit "R_MAX=825" 64.

Referring to FIG. 4C, the device interface circuit 30 of a receiving LLN device (e.g., "L", "M", "P", "Q", and/or "S") in operation 70 can receive the multicast data message 24 from one or more transmitting LLN devices 14, for example the multicast data message 24a from the multicast origin "R" 14. As illustrated in FIGS. 1, 2, and 5, over time multiple LLN devices can multicast the multicast data message 24, resulting in a receiving LLN device (e.g., "M" or "Q") 14 receiving multiple copies of the multicast data message (e.g., 24a, 24b) from different transmitting LLN devices (e.g., the multicast origin "R" 14 and the LLN device "P" 14), for example based on executing the Trickle algorithm as described in RFC 7731. Hence the processor circuit 32 of a receiving LLN device 14 in operation 70 can wait for an identifiable time interval (e.g., based on the Trickle algorithm as described in RFC 6206) to determine whether to wait for an additional copy of the multicast data message 24 before proceeding with the operations described below.

Assuming reception of two or more multicast data messages 24 after an identifiable time interval (e.g., based on the Trickle algorithm), the processor circuit 32 of the receiving LLN device 14 in operation 72 can detect a lowest distance limit value (designated "M-CAST MIN"), representing the multicast data message 24 having been transmitted from nearest to the multicast origin "R" 14, among the absolute values of the respective current distance fields 52 of the received multicast data messages 24. If only one multicast data message 24 is received after the identifiable time interval (e.g., the LLN device "L" receives only the original multicast data message 24 from the multicast origin "R" 14), the single minimum distance value 46 can be designated the lowest distance limit value "M-CAST MIN").

The processor circuit 32 of the receiving LLN device 14 in operation 72 also can determine the distance limit value 48 from the distance limit field 50 from any one of the received multicast data messages 24.

The processor circuit 32 of the receiving LLN device 14 in operation 74 can determine the DODAG rank "Rank_n" of the neighboring LLN device "n" that multicast the multicast data message 24 with the lowest distance limit value "M-CAST MIN". In one example, the processor circuit 32 of the receiving LLN device 14 in operation 74 can determine whether the received multicast data message 24 specifies a current rank field 58 that identifies the DODAG rank "Rank_n" 60; the processor circuit 32 of the receiving LLN device 14 in operation 74 also can determine the rank "Rank_n" of the neighboring LLN device "n" 14 from a neighbor table, stored in its memory circuit 34, that identifies respective ranks of neighboring LLN devices 14 having previously advertised a DIO message during formation of the DODAG 20.

The processor circuit 32 of the receiving LLN device 14 in operation 76 can determine its own rank "RxRank": in one example, the processor circuit 32 of the receiving LLN device 14 in operation 76a can use its DODAG rank value; in another example, the processor circuit 32 of the receiving LLN device 14 in operation 76b can calculate a multicast rank. In particular, the processor circuit 32 of the receiving LLN device 14 in operation 76b can determine one or more receiver metrics (e.g., Received Signal Strength Indicator (RSSI), signal-to-noise ratio, bit error rate (BER), etc.) associated with receiving the multicast data message 24; the processor circuit 32 of the receiving LLN device 14 in operation 76b also can identify the multicast objective function specified by the multicast objective function identifier 56, and apply the receiver metrics and the transmit power value 54 specified in the received multicast data message 24 to determine the multicast rank to be applied as the receiver rank "RxRank".

The processor circuit 32 of the receiving LLN device 14 in operation 78 can determine its updated distance "D" to the multicast origin "R" 14 based on adding to the lowest distance value "D=M-CAST MIN" (obtained from the current distance field 52 of the received multicast data message 24 in operation 72) the rank difference between the corresponding neighboring transmitting LLN device "Rank_n" (determined in operation 74) and the receiving LLN device 14 "RxRank", i.e., "D=D+('RxRank'−'Rank_n')".

As illustrated in FIG. 5, the processor circuit 32 of the receiving network device "P" 14 can determine that the current distance of the received multicast data message 24a is "D=1" (based on the minimum distance value 46 in the current distance field 52), and the rank of the transmitting multicast origin "R" 14 is "Rank_R=750" (specified as the DODAG-based rank 60 in the current rank field 58 or obtained from the neighbor table); hence the receiving network device "P" 14 can determine in operation 78 (from its rank of "RxRank=700") that its updated distance is "D_P=1+(700−750)=−49" (a negative value indicating the receiver is higher in the DODAG 20 than the transmitter).

The receiving network device "Q" 14 (having the DODAG rank "RxRank=850") can determine in operation 78 (based on the received multicast data message 24a) that its updated distance is "D_Q=1+(850−750)=101" (a positive value indicating the receiver is lower in the DODAG 20 than the transmitter).

The receiving network device "S" 14 (having the DODAG rank "RxRank=600") can determine in operation 78 (based on the received multicast data message 24a) that its updated distance is "D_S=1+(600−750)=−149".

The receiving network device "L" 14 (having the DODAG rank "RxRank=500") can determine in operation 78 (based on the received multicast data message 24 from the multicast origin "R" 14) that its updated distance is "D_L=1+(500−750)=−249".

The processor circuit 32 of the receiving network device "L" 14 can determine in operation 80 that the absolute value of its updated distance "|D_L|=249" is not less than the distance limit value "DL=249", i.e., "|D|=DL". Hence, the processor circuit 32 of the receiving network device "L" 14 in operation 82 suppresses transmission of the multicast data message 24 in response to determining in operation 80 that the receiving network device "L" 14 is at the distance limit relative to the multicast origin "R" 14, i.e., that the updated distance of the receiving network device "L" to the multicast origin "R" 14 (expressed as the absolute value "|D_L|") is not less than the distance limit value "DL=249" 48 specified in the multicast data message 24. Hence, the suppression of transmission by the receiving network device "L" 14 prevents propagation of the multicast data message 24 beyond the limited region 22.

Depending on implementation preference, the distance limit value 48 also can be set such that the receiving network device "L" 14 can multicast transmit the multicast data message 24 to the first-hop "gateway" device "F" 14 (e.g., if the distance value is set to "251"), but that the gateway device "F" that is outside the limited region 22 suppresses any transmission of the multicast data message 24 outside the limited region 22.

Hence, multicast transmissions of the multicast data message 24 can be executed within the limited region 22, while suppressing any transmission of the multicast data message 24 outside the limited region 22.

The processor circuit 32 of the receiving network device "P" 14 can determine in operation 80 that the absolute value of its updated distance "|D_P|=49" is less than the distance limit value "DL=249", i.e., "|D|<DL". In an optional operation 84, the processor circuit 32 of the receiving network device "P" 14 also can determine that its corresponding DODAG rank "RxRank" is within the minimum rank limit "R_MIN=550" 68 and the maximum rank limit "R_MAX=825" 64, based on determining the DODAG-based rank 60 in the current rank field 58 of the received multicast data message 24a, and adding the rank difference ("step of rank") to the DODAG-based rank 60 of the transmitting multicast origin "R" 14, i.e., "(RxRank−Rank_R)+TxRank", or "(700−750)+750=700" which falls within the range of "550<700<825".

Hence, the processor circuit 32 of the receiving network device "P" 14 in operation 86 can update the relevant fields of the multicast data message 24a, including the current distance field 52 to specify a distance of "D=−49", the current rank field 58, and the transmit power value 54, and multicast transmit in operation 86 the multicast data message 24b comprising the distance limit field 50 specifying the distance limit value "DL=249" 48, and the updated fields including the current distance "−49" in the current distance field 52. Similarly, the receiving network device "S" (having the DODAG rank "RxRank=600") can determine in operation 80 that the absolute value of the updated distance is less than the distance limit value, and determine in operation 84 that the rank is within the limits 64 and 68, and in response multicast the multicast data message 24c after updating the relevant fields as described above (including specifying the current distance field 52 with the current distance value "D=−149").

In contrast, although the processor circuit 32 of the receiving network device "Q" can determine that it is within the distance limit value 48 in operation 80, the processor circuit 32 of the receiving network device "Q" can determine in operation 84 that its rank "RxRank=850" exceeds the maximum rank limit "R_MAX" 64, hence the processor circuit 32 of the receiving network device "Q" suppresses at least downward transmission of the multicast data message 24 in operation 82. Similarly, since the network devices "M" and "U" each have a DODAG rank of "525", the network devices "M" and "U" can be within the distance limit value 48 ("D=−224") in operation 80, but the processor circuit 32 of the network devices "M" and "U" can determine that their corresponding rank "RxRank=525" is less than the minimum rank value of "R_MIN=550", causing the network devices "M" and "U" to suppress at least upward transmission of the multicast data message 24 in operation 82.

Hence, the minimum rank limit "R_MIN" 68 can limit upward flooding (toward the root network device 12), and the maximum rank limit "R_MAX" 64 can limit downward flooding (toward the leaves of the DODAG 20 inside the limited region 22).

According to example embodiments, multicast transmissions can be localized based on a rank-based distance relative to a multicast origin. The rank-based distance can be based solely on a DODAG-based rank, or can be based on a multicast rank that is generated according to an objective function optimized for localized multicast transmissions.

An additional embodiment can include an apparatus comprising a processor circuit and a device interface circuit. The processor circuit is configured for identifying a minimum distance value to be used for multicast transmission as a low power and lossy network (LLN) device in a low power and lossy network (e.g., the minimum distance value identifying the apparatus as a multicast origin), the processor circuit further configured for identifying a distance limit value for limiting multicast propagation, initiated at the LLN device, of a multicast data message in the LLN. The device interface circuit is configured for multicast transmitting the multicast data message with a current distance field specifying the minimum distance value and a distance limit field specifying the distance limit value, the multicast transmitting causing a receiving LLN device having a corresponding rank in the LLN to respond to the multicast data message by: (1) determining an updated distance based on adding to the current distance field a rank difference between the receiving LLN device and the LLN device, and (2) selectively retransmitting the multicast data message if the updated distance is less than the distance limit value.

An additional embodiment can include an apparatus implemented as a receiving low power and lossy network (LLN) device in a low power and lossy network, the apparatus comprising a device interface circuit and a processor circuit. The device interface circuit is configured for receiving one or more multicast data messages from respective one or more neighboring transmitting LLN devices in the LLN. The processor circuit is configured for detecting, among the one or more multicast data messages, a lowest distance value in a current distance field and a distance limit value in a distance limit field, the lowest distance value indicating a multicast transmission distance of the corresponding one neighboring transmitting LLN device relative to a multicast origin of the one or more multicast data messages. The processor circuit is configured for determining an updated distance to the multicast origin based on adding to the lowest distance value a rank difference between the corresponding neighboring transmitting LLN device and the receiving LLN device. The processor circuit is configured for causing the device interface circuit to selectively multicast transmit the multicast data message based on the processor circuit determining the updated distance is less than the distance limit value that limits multicast propagation. The processor circuit further is configured for updating the current distance field with the updated distance value prior to transmission of the multicast data message.

An additional embodiment can include an apparatus implemented as a root network device in a low power and lossy network (LLN), the apparatus comprising a processor circuit and a device interface circuit. The processor circuit is configured for limiting multicast propagation of a multicast data message in the LLN based on setting a distance limit value for limiting the multicast propagation, and further based on generating a unicast message containing the multicast data message and the distance limit value. The processor circuit is configured for causing the device interface circuit to unicast transmit the unicast message containing the multicast data message and the distance limit value to an LLN device via the LLN. The unicast message causes the LLN device to multicast transmit the multicast data message with a current distance field specifying a minimum distance value of the LLN device and a distance limit field specifying the distance limit value. The processor circuit causes the limiting multicast propagation in the LLN based on causing a receiving LLN device having a corresponding rank in the LLN to respond to the multicast data message by: (1) determining an updated distance based on adding to the current distance field a rank difference between the receiving LLN device and the LLN device, and (2) selectively retransmitting the multicast data message if the updated distance is less than the distance limit value, wherein the receiving LLN device suppresses any transmission of the multicast data message if the updated distance is not less than the distance limit value.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by a receiving low power and lossy network (LLN) device in a low power and lossy network, one or more multicast data messages from respective one or more neighboring transmitting LLN devices in the LLN;
   detecting, by the receiving LLN device among the one or more multicast data messages, a lowest distance value in a current distance field and a distance limit value in a distance limit field, the lowest distance value indicating a multicast transmission distance of a corresponding one neighboring transmitting LLN device relative to a multicast origin of the one or more multicast data messages;
   determining, by the receiving LLN device, an updated distance to the multicast origin based on adding to the lowest distance value a rank difference between the corresponding neighboring transmitting LLN device and the receiving LLN device; and
   selectively multicast transmitting, by the receiving LLN device, the multicast data message based on determining the updated distance is less than the distance limit value that limits multicast propagation, the selectively multicast transmitting including updating the current distance field with the updated distance prior to transmission,
   wherein the selectively multicast transmitting includes suppressing any transmission of the multicast data message in response to determining the updated distance is not less than the distance limit value.

2. The method of claim 1, further comprising:
   detecting by the receiving LLN device, within the one multicast data message specifying the lowest distance value, a wireless transceiver tuning value associated with the one neighboring transmitting LLN device, and a multicast objective function identifier; and determining, by the receiving LLN device, receiver metrics associated with reception of the one multicast data message specifying the lowest distance value;

the determining of the updated distance including determining a corresponding rank of the receiving LLN device as a multicast rank based on executing an objective function, identified by the multicast objective function identifier, relative to the wireless transceiver tuning value and the receiver metrics, and applying the multicast rank to the rank difference between the corresponding neighboring transmitting LLN device.

3. The method of claim 1, further comprising:

detecting by the receiving LLN device, within the one multicast data message specifying the lowest distance value, a corresponding rank of the corresponding one neighboring transmitting LLN device in a current rank field, and a rank limit in a rank limit field;

selectively limiting one or more of upward flooding or downward flooding of the multicast data message in the LLN based on a corresponding rank of the receiving LLN device relative to the current rank field and the rank limit;

wherein the rank limit identifies one or more of a minimum rank limit for limiting upward flooding to an LLN device having the minimum rank limit as its corresponding rank, or a maximum rank limit for limiting downward flooding to an LLN device having the maximum rank limit as its corresponding rank.

4. One or more non-transitory tangible media encoded with logic for execution by a machine and when executed by the machine operable for:

receiving, by a machine implemented as a receiving low power and lossy network (LLN) device in a low power and lossy network, one or more multicast data messages from respective one or more neighboring transmitting LLN devices in the LLN;

detecting, by the receiving LLN device among the one or more multicast data messages, a lowest distance value in a current distance field and a distance limit value in a distance limit field, the lowest distance value indicating a multicast transmission distance of a corresponding one neighboring transmitting LLN device relative to a multicast origin of the one or more multicast data messages;

determining, by the receiving LLN device, an updated distance to the multicast origin based on adding to the lowest distance value a rank difference between the corresponding neighboring transmitting LLN device and the receiving LLN device; and selectively multicast transmitting, by the receiving LLN device, the multicast data message based on determining the updated distance is less than the distance limit value that limits multicast propagation, the selectively multicast transmitting including updating the current distance field with the updated distance prior to transmission, wherein the selectively multicast transmitting includes suppressing any transmission of the multicast data message in response to determining the updated distance is not less than the distance limit value.

5. The one or more non-transitory tangible media of claim 4, further operable for:

detecting by the receiving LLN device, within the one multicast data message specifying the lowest distance value, a wireless transceiver tuning value associated with the one neighboring transmitting LLN device, and a multicast objective function identifier; and determining, by the receiving LLN device, receiver metrics associated with reception of the one multicast data message specifying the lowest distance value;

the determining of the updated distance including determining a corresponding rank of the receiving LLN device as a multicast rank based on executing an objective function, identified by the multicast objective function identifier, relative to the wireless transceiver tuning value and the receiver metrics, and applying the multicast rank to the rank difference between the corresponding neighboring transmitting LLN device.

6. The one or more non-transitory tangible media of claim 4, further operable for:

detecting by the receiving LLN device, within the one multicast data message specifying the lowest distance value, a corresponding rank of the corresponding one neighboring transmitting LLN device in a current rank field, and a rank limit in a rank limit field;

selectively limiting one or more of upward flooding or downward flooding of the multicast data message in the LLN based on a corresponding rank of the receiving LLN device relative to the current rank field and the rank limit;

wherein the rank limit identifies one or more of a minimum rank limit for limiting upward flooding to an LLN device having the minimum rank limit as its corresponding rank, or a maximum rank limit for limiting downward flooding to an LLN device having the maximum rank limit as its corresponding rank.

* * * * *

UNITED STATES PATENT AND TRADEMARK OFFICE
CERTIFICATE OF CORRECTION

| | |
|---|---|
| PATENT NO. | : 11,909,545 B2 |
| APPLICATION NO. | : 17/866768 |
| DATED | : February 20, 2024 |
| INVENTOR(S) | : Pascal Thubert et al. |

It is certified that error appears in the above-identified patent and that said Letters Patent is hereby corrected as shown below:

In the Specification

Column 13, Line 60 please amend as shown:
of its updated distance "|D_L|=249" is not less than the Column 13, Line 61 please amend as shown:
distance limit value "DL=249", i.e., "|D|=DL". Hence, the Column 14, Line 1 please amend as shown:
origin "R" 14 (expressed as the absolute value "|D_L|") is Column 14, Line 23 please amend as shown:
limit value "DL=249", i.e., "|D|<DL". In an optional opera- Signed and Sealed this
Fourteenth Day of May, 2024

Katherine Kelly Vidal
*Director of the United States Patent and Trademark Office*